United States Patent
Uchida

(10) Patent No.: US 10,146,475 B2
(45) Date of Patent: Dec. 4, 2018

(54) MEMORY DEVICE PERFORMING CONTROL OF DISCARDING PACKET

(71) Applicant: Toshiba Memory Corporation, Minato-ku (JP)

(72) Inventor: Daisuke Uchida, Taito (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 355 days.

(21) Appl. No.: 14/580,788

(22) Filed: Dec. 23, 2014

(65) Prior Publication Data

US 2016/0070470 A1    Mar. 10, 2016

Related U.S. Application Data

(60) Provisional application No. 62/047,929, filed on Sep. 9, 2014.

(51) Int. Cl.
*G06F 3/06* (2006.01)

(52) U.S. Cl.
CPC ............ *G06F 3/0659* (2013.01); *G06F 3/061* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2005/0254070 A1* | 11/2005 | Sayama | G06F 21/608 358/1.1 |
| 2009/0248942 A1* | 10/2009 | Kloeppner | G06F 13/4243 710/310 |
| 2013/0036339 A1 | 2/2013 | Shiraishi | |
| 2013/0073793 A1* | 3/2013 | Yamagishi | G06F 13/16 711/103 |
| 2013/0073795 A1 | 3/2013 | Hasegawa | |
| 2013/0145105 A1* | 6/2013 | Sawicki | G06F 3/0619 711/147 |
| 2014/0330924 A1* | 11/2014 | Lientz | H04L 67/06 709/213 |

FOREIGN PATENT DOCUMENTS

| | | |
|---|---|---|
| JP | 2010-9472 | 1/2010 |
| JP | 2013-50938 | 3/2013 |
| JP | 2013-77278 | 4/2013 |
| JP | 5547154 | 7/2014 |

* cited by examiner

*Primary Examiner* — Sean D Rossiter
*Assistant Examiner* — Charles J Choi
(74) *Attorney, Agent, or Firm* — Oblon, McClelland, Maier & Neustadt, L.L.P.

(57) ABSTRACT

According to one embodiment, a memory device includes a nonvolatile first memory, a second memory, a controller, and an interface unit. When receiving a first packet from the interface unit, the controller transmits a second packet to an initiator via the interface unit. In the case where a header of a third packet does not match the second packet, the controller does not store the third packet to a second memory, the third packet being discarded.

18 Claims, 8 Drawing Sheets

United States Patent page …

MEMORY DEVICE PERFORMING CONTROL OF DISCARDING PACKET

CROSS-REFERENCE TO RELATED APPLICATIONS

This application is based upon and claims the benefit of priority from U.S. Provisional Patent Application No. 62/047,929, filed on Sep. 9, 2014; the entire contents of which are incorporated herein by reference.

FIELD

Embodiments described herein relate generally to a memory device and a memory controller having a nonvolatile memory.

BACKGROUND

UFS (Universal Flash Storage) is a storage standard which is developed for the purpose of achieving high throughput and low power consumption. In the UFS standard, a host is referred to as an initiator, and a memory device serving as an external storage device is referred to as a target. The target includes a nonvolatile memory such as a NAND-type flash memory.

In the UFS standard, when the target receives a write command from the initiator, the target prepares for the write command, and transmits Ready To Transfer UPIU designating the receivable data size and the like to the initiator. In response thereto, the initiator transmits Data Out UPIU serving as write data to the target. A packet based on UFS standard is referred to as UPIU.

DETAILED DESCRIPTION

In general, according to one embodiment, a memory device includes a nonvolatile first memory, a second memory, an interface unit, and a controller. The controller is configured to control the interface unit. when receiving a first packet from the interface unit, the controller transmits a second packet to an initiator via the interface unit, the first packet being a write command received from the initiator, the second packet requesting data transfer to the initiator, the second packet specifying content of a third packet. the interface unit includes a comparison unit configured to compare the second packet transmitted to the initiator with a header of the third packet received from the initiator, the third packet including the header and data. In the case where the header of the third packet matches the second packet, the controller temporarily stores the third packet to the second memory, and writes the data of the temporarily stored third packet to the first memory. In the case where the header of the third packet does not match the second packet, the controller does not store the third packet to the second memory, the third packet being discarded.

Exemplary embodiments of a memory device and a memory controller will be explained below in detail with reference to the accompanying drawings. The present invention is not limited to the following embodiments.

First Embodiment

Figure 1:
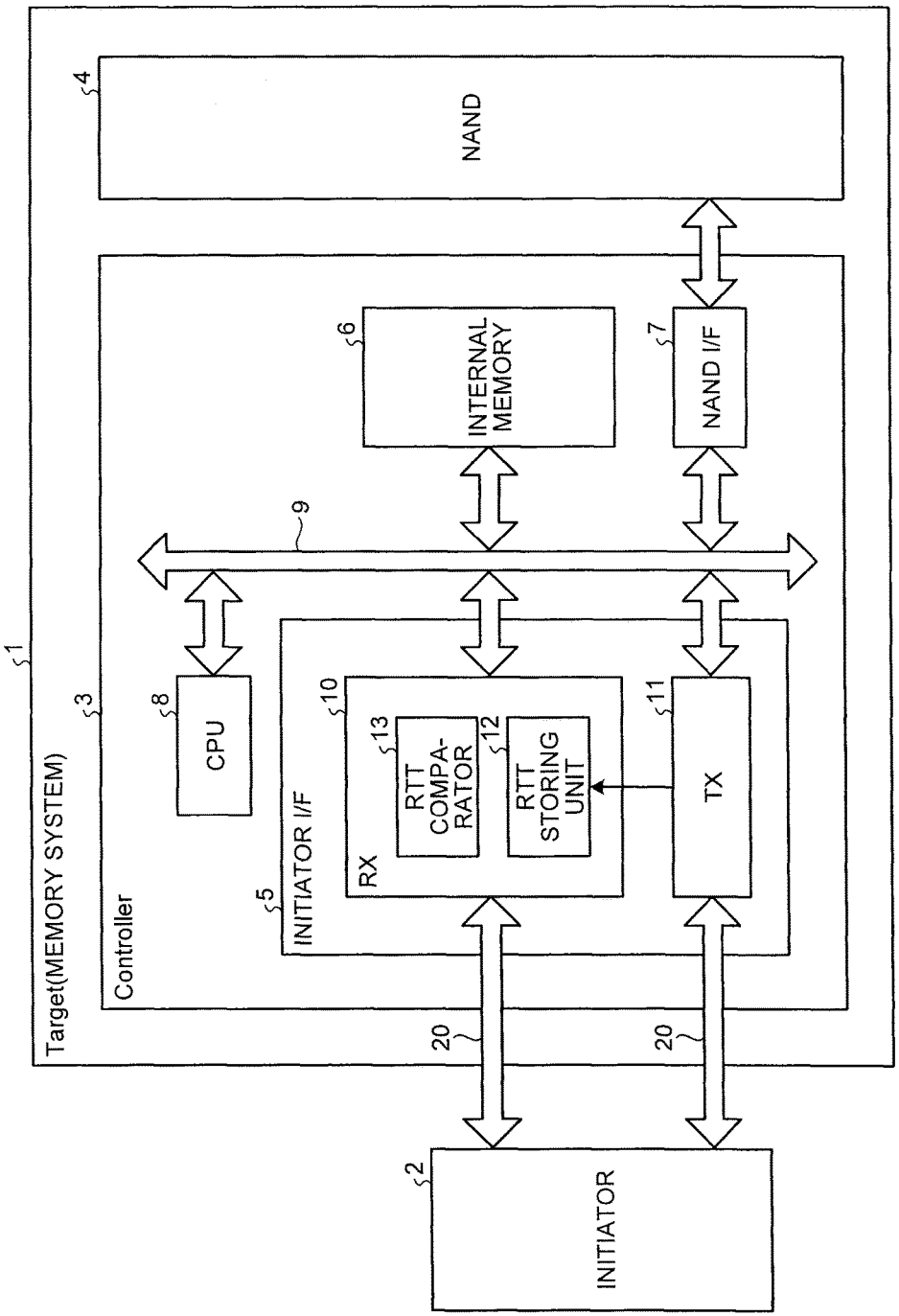
FIG. 1 is a functional block diagram illustrating an internal configuration of a memory device according to a first embodiment.

FIG. 1 is a block diagram illustrating an example of internal configuration of a target 1 which is a memory device according to a first embodiment to which UFS standard is applied. The target 1 is connected to an initiator 2, serving as a host, via a communication path 20, and functions as an external storage device of the initiator 2. The target 1 and the initiator 2 are based on UFS standard. The initiator 2 is, for example, a cellphone, a personal computer, or an imaging device.

The target 1 includes a controller 3 and a NAND-type flash memory (hereinafter abbreviated as NAND) 4 serving as a nonvolatile memory. The NAND 4 includes one or more memory chips having memory cell arrays. The memory cell array has a plurality of memory cells arranged in a matrix form. Each of memory cell arrays has a plurality of blocks arranged therein, the blocks are units of erasing of data. Each block includes a plurality of pages. The page is the minimum unit of reading and writing. The controller 3 executes data transfer control between the initiator 2 and the NAND 4.

The nonvolatile memory 4 is not limited to a NAND flash. The nonvolatile memory 4 may be three-dimensional structure flash memory, ReRAM (Resistance Random Access Memory)), FeRAM (Ferroelectric Random Access Memory), a hard disk, and the like.

The initiator 2 issues a write command and write data to the target 1. The initiator 2 issues a read command to the target 1. The write command, the read command, and the write data is transmitted, as a packet based on UFS standard, to the initiator 2.

The target 1 includes an initiator interface 5, an internal memory 6, a NAND interface 7, a CPU (processor) 8, and a bus 9.

The initiator I/F 5 transmits and receives a command packet and data packet to/from the initiator 2 via the communication path 20. The initiator I/F 5 includes a reception unit 10, and receives a packet from the initiator 2. The initiator I/F 5 includes a transmission unit 11, and transmits a packet to the initiator 2. Hereinafter, a packet will be referred to as UPIU.

In accordance with the control of the CPU 8, the NAND I/F 7 executes the write control to NAND 4, and the read control from the NAND 4.

The internal memory 6 is a memory allowing for a higher speed access than the NAND 4. The internal memory 6 has a storage area for temporarily storing the data before data received from the initiator 2 are written to the NAND 4 via the NAND I/F 7. The internal memory 6 has a storage area for temporarily storing data read from the NAND 4 via the NAND I/F 7. The internal memory 6 has a storage area for storing and updating management information for managing the target 1. The management information includes a mapping table indicating relationship between a logical address designated by the initiator 2 and a storage position (physical address) on the NAND 4. The management information is backed up by the NAND 4. For example, the SRAM (Static Random Access Memory) and the DRAM (Dynamic Random Access Memory) are used as the internal memory 6.

The CPU 8 achieves the function by executing the firmware. The CPU 8 totally controls internal constituent elements of the target 1. The CPU 8 controls transmission/reception of UPIU between the initiator 2 and the initiator I/F 5. The CPU 8 reads a command received by the reception unit 10 of the initiator I/F 5, and executes processing according to the read command. When write data is received from the initiator 2, the CPU 9 controls the initiator I/F 5 to temporarily store the write data to the internal memory 6. The CPU 8 reads the write data from the internal memory 6, and writes the read data to the NAND 4 via the NAND I/F 7. The CPU 8 updates the management information in the internal memory 6 in accordance with the write processing.

When the read command is received from the initiator 2, the CPU 8 identifies the position on the NAND 4 designated by the read command on the basis of the management information, and reads data from the NAND 4 on the basis of the identified position information. The read data is temporarily stored to the internal memory 6 via the NAND I/F 7, and thereafter, the read data is transmitted via the transmission unit 11 of the initiator I/F 5 to the initiator 2.

In the UFS standard, a Command UPIU is used as a request of reading and writing given by the initiator 2. The Command UPIU includes a field of a logical address and a field of size information (data length). The Response UPIU is a UPIU issued by the target 1 when the execution of the processing requested by the initiator 2 with the Command UPIU has been finished. More specifically, when the processing requested by the Command UPIU is finished, the target 1 transmits a Response UPIU corresponding to the Command UPIU.

In the UFS standard, the transfer of data between the initiator 2 and the target 1 is executed such that the data is divided into small data in a size DS. The Data In UPIU is used to transfer read data from the target 1 to the initiator 2. More specifically, the Data In UPIU is an UPIU issued by the target 1 when the divided small data is transferred from the target 1 to the initiator 2. A Ready To Transfer UPIU (hereinafter abbreviated as RTT UPIU) is a UPIU issued by the target 1 every time it is ready to receive divided small data. A Data Out UPIU is used when write data is transferred from the initiator 2 to the target 1. More specifically, a Data Out UPIU is a UPIU issued by the initiator 2 when divided small data is transferred from the initiator 2 to the target 1. The divided small data is transferred as a payload of the Data In UPIU or the Data Out UPIU through the communication path 20.

Figure 2:
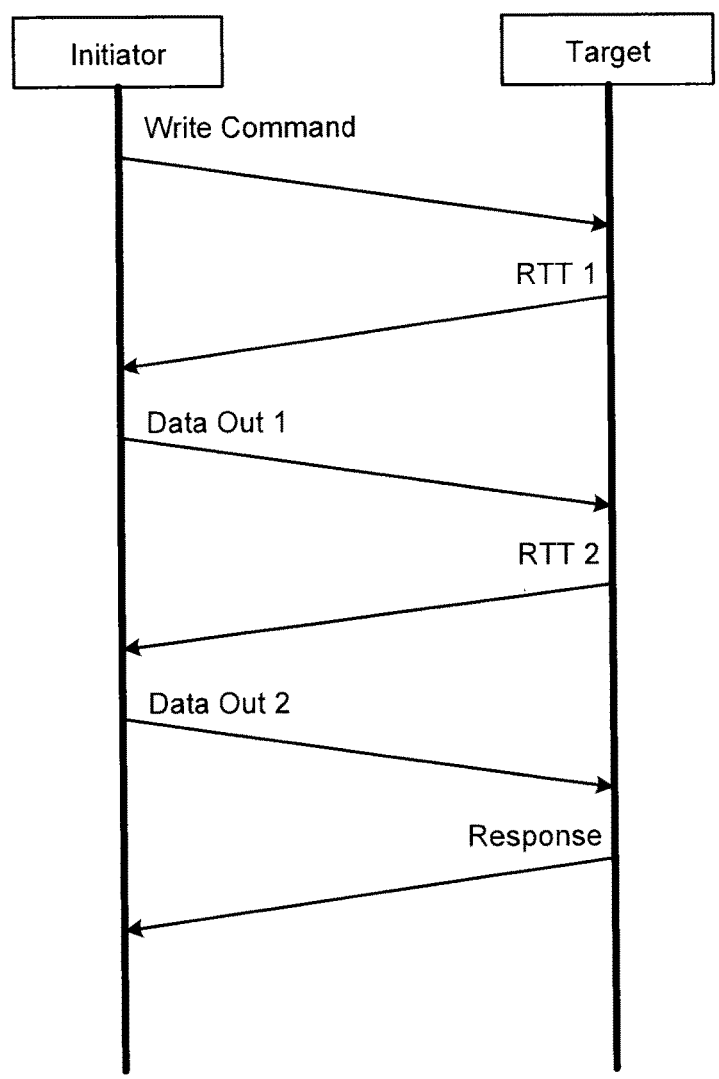
FIG. 2 is a timing chart for explaining an example of communication procedure during writing.

FIG. 2 is a timing chart for explaining an example of communication procedure during writing. First, the initiator 2 transmits a write command in a format of Command UPIU to the target 1. As described above, the write command includes a field of Logical Unit Number (LUN), a field of Task Tag, a field of logical address, a field of data length, and the like. The LUN designates a partition number on the NAND 4. The Task Tag is information for identifying the Command UPIU.

When the target 1 receives the write command, an area for receiving the write data is assigned in the internal memory 6. And when the target 1 is ready to receive the data, the target 1 transmits the RTT UPIU to the initiator 2. The RTT UPIU includes LUN, Task Tag, data size DS, and write address WAD. The LUN and the Task Tag included in the RTT UPIU are the same as the LUN and the Task Tag included in the corresponding write command UPIU from the initiator 2.

The data size DS is a data size that can be currently received by the target 1, and indicates the size of the divided small data. The write address indicates the logical address at the head of the divided small data.

When this RTT UPIU is received, the initiator 2 extracts, from the write data designated by the write command, data starting from the write address WAD and having a size designated by the data size DS, and transmits the extracted data to the target 1, using the Data Out UPIU as a header. The Data Out UPIU includes the same LUN, Task Tag, data size DS, and write address WAD as the LUN, Task Tag, data size DS, and write address WAD included in the corresponding RTT UPIU. Thus, RTT UPIU requests data transfer to the initiator and specifies contents of Data Out UPIU.

When the target 1 receives this Data Out UPIU, the target 1 buffers the data included in the payload of the Data Out UPIU to the internal memory 6. The transmission and the reception of the RTT UPIU and the divided small data are repeated until the transfer of all the write data designated by the write command has been finished. The data size DS designated by the RTT UPIU may be different for each RTT UPIU. When the target 1 receives all the data to be written, the target 1 transmits the Response UPIU to the initiator 2. The LUN and the Task Tag included in the Response UPIU are the same as the LUN and the Task Tag included in the corresponding write command UPIU from the initiator 2.

Figure 3:
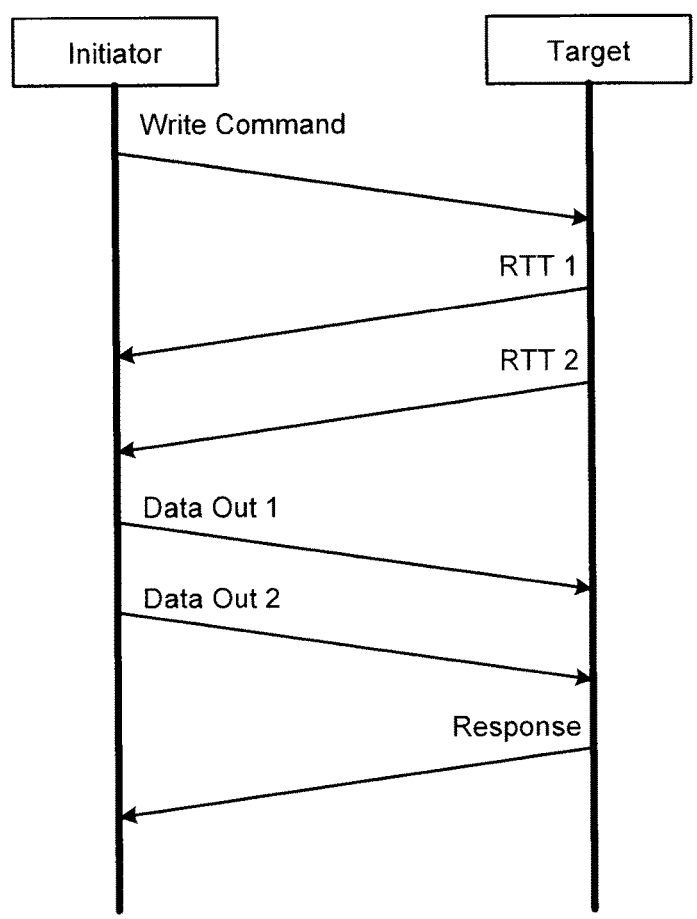
FIG. 3 is a timing chart for explaining another example of communication procedure during writing.

FIG. 3 is a timing chart for explaining another example of communication procedure during writing. In the UFS communication in FIG. 3, up to N RTT UPIUs can be transmitted continuously. In the case of FIG. 3, N is 2. The communication between the initiator 2 and the target 1 determines that up to N RTT UPIUs can be transmitted continuously. In the case of FIG. 3, the target 1 transmits two RTT UPIUs continuously to the initiator 2. In response thereto, the initiator 2 transmits two Data Out UPIUs continuously to the target 1.

In the communication of the write command according to the UFS standard, information included in the RTT UPIU and header information in the Data Out UPIU actually received may be different. Such situation may occur in a case where there is discrepancy between the processing contents of the initiator 2 and the target 1. For example, the initiator 2 interrupts writing of data corresponding to the write command, and before the interruption processing of the initiator 2 is completed, processing of another write command is performed. In this case, discrepancy occurs between the information of the RTT UPIU and the header information of the Data Out UPIU.

In the UFS standard, the target 1 is a slave for the initiator 2, and therefore, the reception operation cannot be kept waiting. In a method according to a comparative example for storing all the received data to the internal memory 6, the internal memory 6 also stores data included in the Data Out UPIU having a header different from the RTT UPIU commanded by the initiator 2. For this reason, even if it thereafter tries to receive normal Data Out UPIU, the normal Data Out UPIU may not be received because of the shortage of the internal memory 6.

Therefore, in the present embodiment, the target 1 saves a history of the transmitted RTT UPIU, and compares header of the received Data Out UPIU with the saved history of the RTT UPIU, and does not store, to the internal memory 6, the Data Out UPIU that does not match the history of the RTT UPIU saved, and discards the Data Out UPIU.

In FIG. 1, the reception unit 10 of the initiator I/F 5 includes an RTT storing unit 12 and an RTT comparator 13. The CPU 8 generates one or more RTT UPIUs on the basis of the write command in the format of the Command UPIU received from the initiator 2, and inputs the generated RTT UPIU into the transmission unit 11. The transmission unit 11 transmits the RTT UPIU to the initiator 2, and outputs the transmitted RTT UPIU to the reception unit 10.

The RTT storing unit 12 stores the transmitted RTT UPIU which is input from the transmission unit 11. The RTT comparator 13 compares the header of the Data Out UPIU received from the initiator 2 with the RTT UPIU stored in the RTT storing unit 12. When the header is determined to match therewith by the RTT comparator 13, the matching RTT UPIU is deleted from the RTT storing unit 12.

As illustrated in FIG. 2, in a case of UFS communication in which RTT UPIUs are transmitted one by one, the RTT storing unit 12 store only a single RTT UPIU, and therefore, there is only one RTT UPIU which is to be compared with the Data Out UPIU in the RTT comparator. However, up to N RTT UPIUs can be transmitted continuously as illustrated in FIG. 3, the RTT storing unit 12 stores up to N RTT UPIUs. The UFS communication does not permit overtaking of Data Out UPIU. The overtaking of the Data Out UPIU means a Data Out 2 is received earlier than a Data Out 1 by the target 1 in FIG. 3. For this reason, in a case where up to N RTT UPIUs can be transmitted continuously, what is to be compared with the Data Out UPIU by the RTT comparator is an RTT UPIU stored at the earliest point in time in the RTT storing unit 12, and in other words, it is an RTT UPIU stored first. In a case of a standard where overtaking is permitted, a determination is made as to whether the header of the Data Out UPIU matches any one of the RTT UPIUs stored in the RTT storing unit 12.

Figure 4:
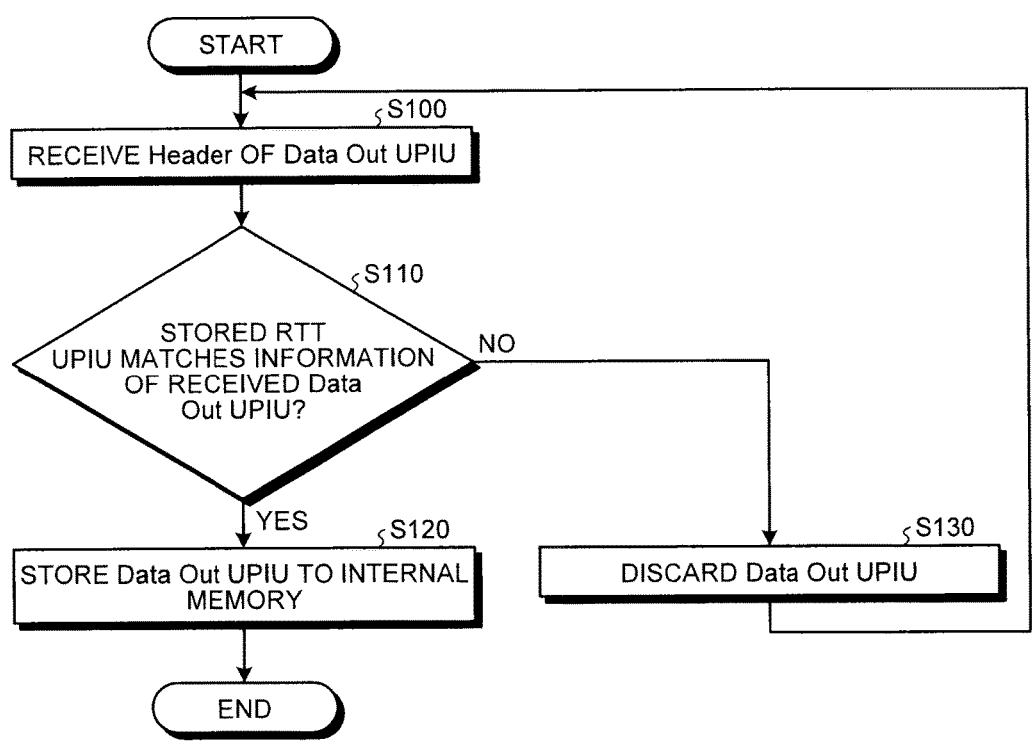
FIG. 4 is a flowchart illustrating reception processing of RTT UPIU according to the first embodiment.

FIG. 4 is a flowchart illustrating reception processing of RTT UPIU by the reception unit 10. The reception unit 10 receives the header of a Data Out UPIU (step S100). When the reception unit 10 receives the header of the Data Out UPIU, the RTT comparator 13 compares the header of the received Data Out UPIU with the comparison target RTT UPIU stored in the RTT storing unit 12 (step S110). In this comparison, the LUN, the Task Tag, the data size DS, and the write address WAD in the UPIU are compared.

When the comparison result matches by the RTT comparator 13, the reception unit 10 stores the payload of the received Data Out UPIU to the internal memory 6, and deletes the matching RTT UPIU from the RTT storing unit 12 (step S120). However, when the comparison result does not match in step S110, the reception unit 10 does not store the payload of the received Data Out UPIU to the internal memory 6, and discards the payload (step S130).

Figure 5:
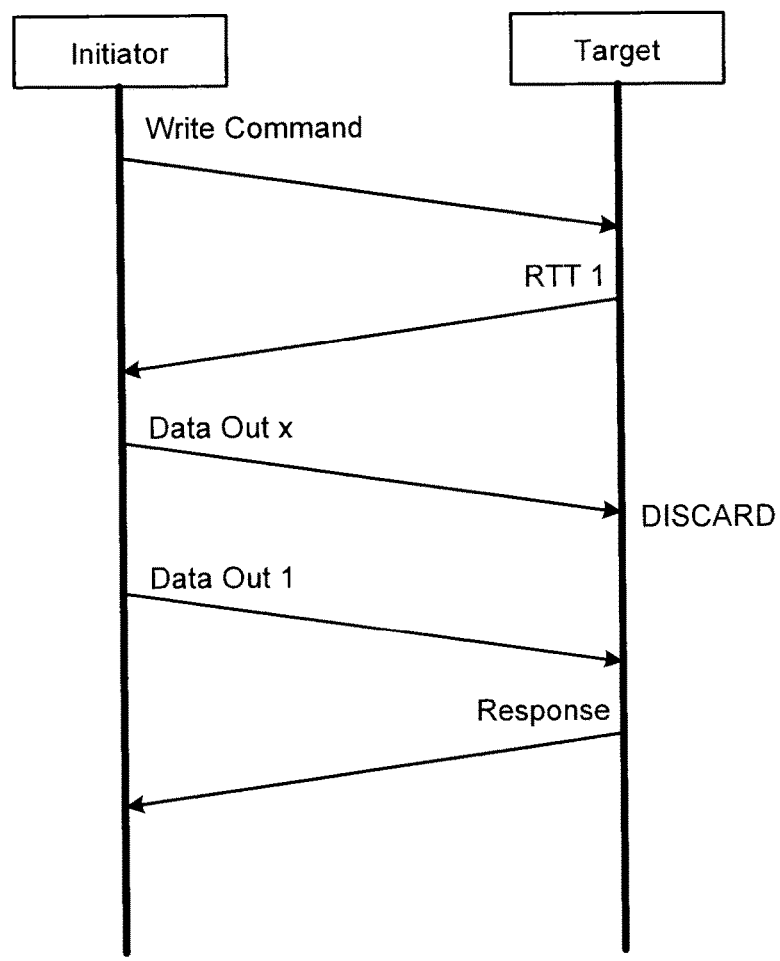
FIG. 5 is a timing chart for explaining an example of communication procedure during writing according to the first embodiment.

FIG. 5 is a timing chart for explaining an example of communication procedure during writing according to the present embodiment. The initiator 2 transmits the write command in the format of the Command UPIU to the target 1. As described above, the write command includes the field of the LUN, the field of the Task Tag, the field of the logical address, the field of the data length, and the like.

When the target 1 receives the write command, an area for receiving the write data is assigned in the internal memory 6, and when it is ready to receive data, the RTT UPIU 1 is transmitted to the initiator 2. The RTT UPIU 1 includes the LUN, the Task Tag, the data size DS, and the write address WAD. The transmitted RTT UPIU is temporarily stored in the RTT storing unit 12.

Thereafter, suppose that the initiator 2 transmits a Data Out UPIU X having a header different from the RTT UPIU 1. The reception unit 10 of the target 1 compares the RTT UPIU 1 temporarily stored in the RTT storing unit 12 as described above with the header of the received Data Out UPIU X. This comparison does not match, and therefore, the payload of the Data Out UPIU X is not stored to the internal memory 6, and is discarded. Thereafter, when the Data Out UPIU 1 having the header matching the RTT UPIU 1 is received, the payload of this Data Out UPIU 1 is stored to the internal memory 6.

Therefore, in the present embodiment, even when the Data Out UPIU having the header different from the RTT UPIU is received, there would be no shortage of the remaining capacity of the internal memory 6, and the normal Data Out UPIU can be received. By the way, when the Data Out UPIU 1 having the header matching the RTT UPIU 1 is received, the header and the payload of this Data Out UPIU 1 may be stored to the internal memory 6.

By the way, an abort request of write command may be transmitted from the initiator 2. For example, after the initiator 2 transmits the write command, the target 1 transmits the RTT UPIU corresponding to the write command to the initiator 2. Thereafter, because of the loss of data which is to be written and which corresponds to the write command or because of the interruption of the writing itself, the initiator 2 cannot send the data corresponding to the RTT UPIU. In such case, the initiator 2 issues an abort request of the write command to the target 1.

In the present embodiment, when the abort request of the write command is received from the initiator 2 after the RTT UPIU is transmitted to the initiator 2, the RTT UPIU corresponding to the abort request is deleted from the RTT storing unit 12. For this reason, thereafter, only the normal Data Out UPIU, which is scheduled, can be received. By the way, when the aborted Data Out UPIU is transmitted by the initiator 2 by mistake, this does not match the RTT transmission history stored in the RTT storing unit 12, and therefore the data is discarded.

Second Embodiment

Figure 6:
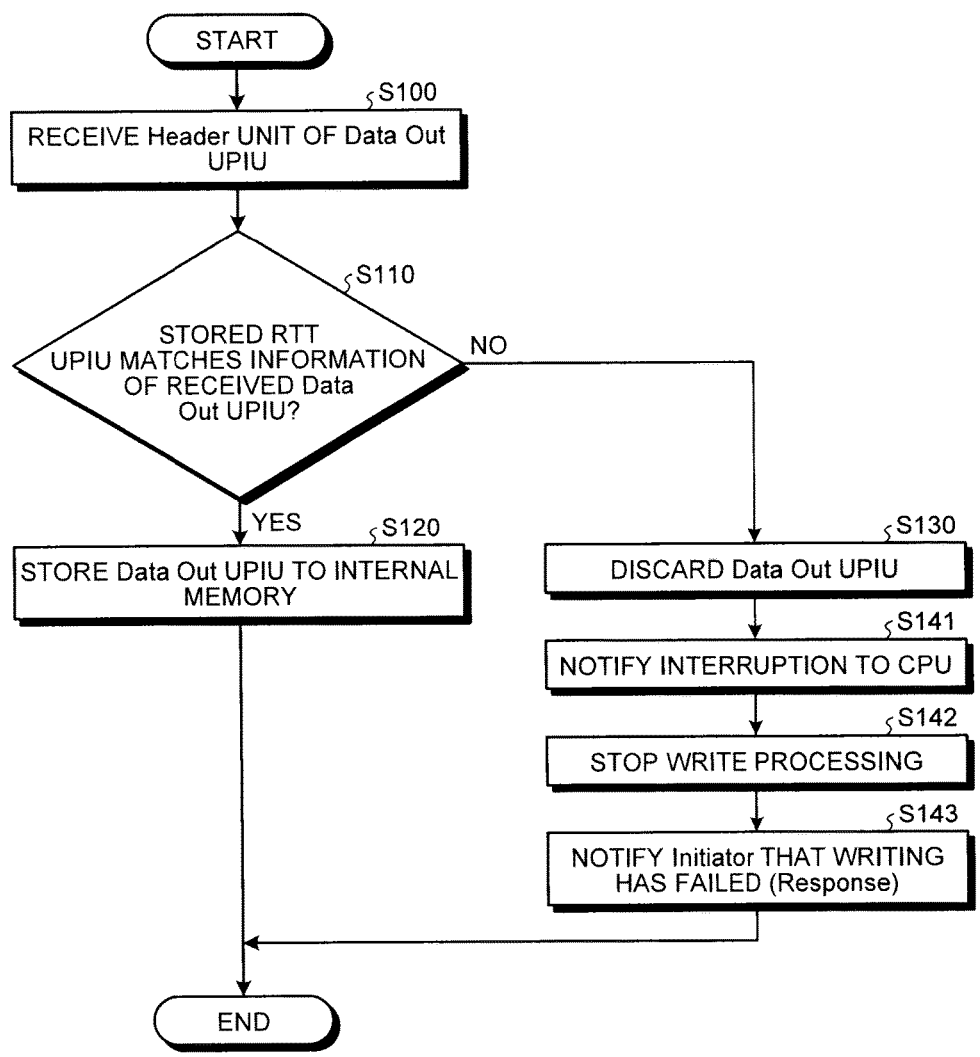
FIG. 6 is a flowchart illustrating reception processing of RTT UPIU according to a second embodiment.

In a second embodiment, when a payload of a Data Out UPIU is discarded, a target 1 notifies an initiator 2 that the writing has failed. FIG. 6 is a flowchart illustrating reception processing of RTT UPIU in a reception unit 10 according to the second embodiment. In FIG. 6, the processing contents in steps S100 to S130 are the same processing contents in steps S100 to S130 as illustrated in FIG. 4, and repeated explanation is omitted.

In FIG. 6, when the comparison result does not match in step S110, the reception unit 10 does not store the payload of the received Data Out UPIU to the internal memory 6, and discards the payload (step S130). Subsequently, the initiator I/F 5 notifies the interruption to the CPU 8 (step S141). In response to this notification, the CPU 8 stops the write processing (step S142). The CPU 8 transmits the Response UPIU, notifying that the writing has failed, to the initiator 2 via the transmission unit 11 of the initiator I/F 5 (step S143).

As described above, in the second embodiment, when the payload of the Data Out UPIU is discarded, the target 1 uses the Response UPIU in response to the write command to notify the initiator 2 that the writing has failed, and this allows efficient recovery back to normal communication.

Third Embodiment

Figure 7:
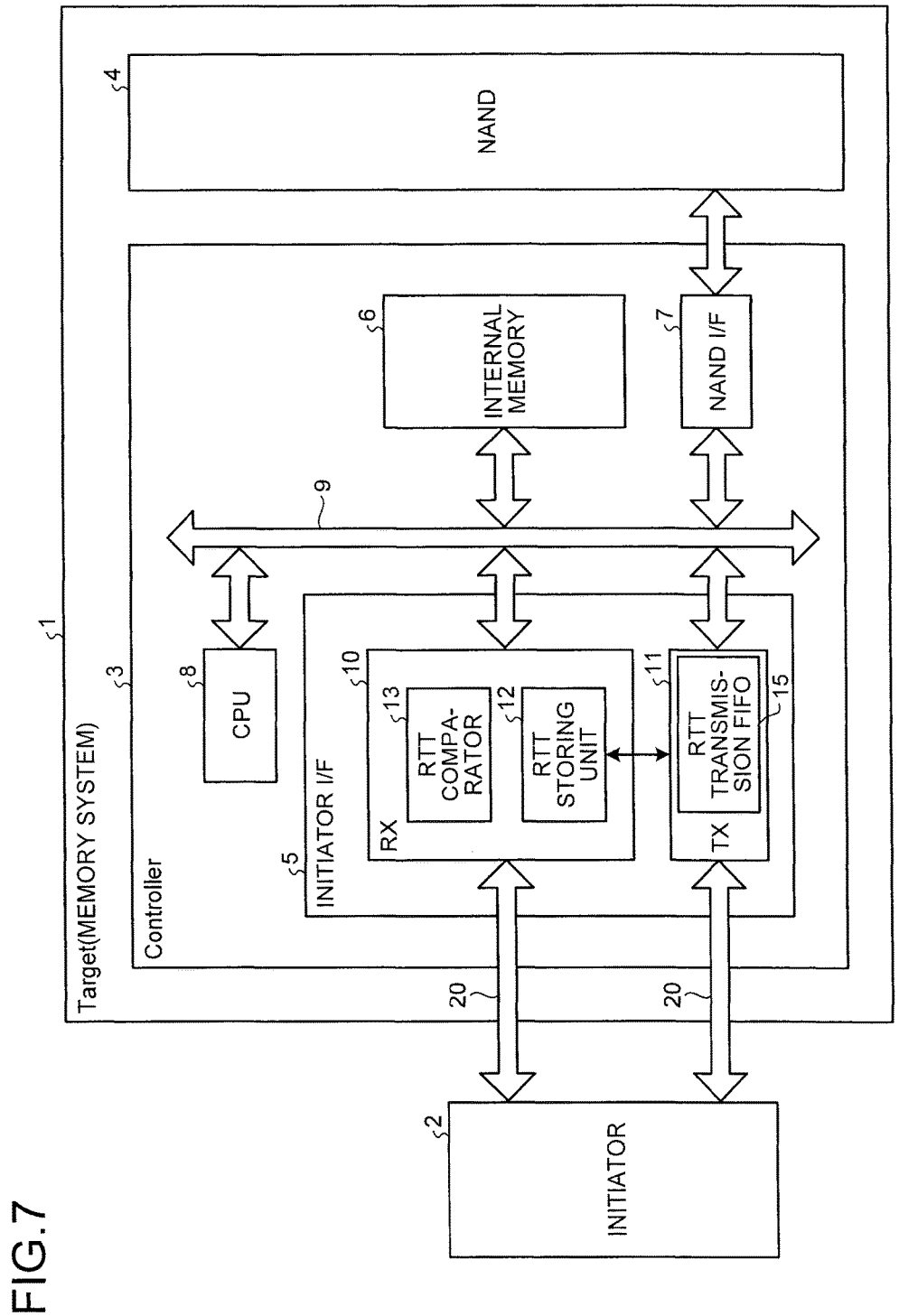
FIG. 7 is a functional block diagram illustrating an internal configuration of a memory device according to a third embodiment.

In a third embodiment, when a normal Data Out UPIU is received, a target 1 transmits a subsequent RTT UPIU. FIG. 7 is a block diagram illustrating an example of internal configuration of the target 1 according to the third embodiment. In FIG. 7, an RTT transmission FIFO 15 is added to the transmission unit 11 of FIG. 1. The RTT transmission FIFO 15 stores multiple RTT UPIUs, which are to be transmitted to the initiator 2, in accordance with FIFO (First in First out) method. More specifically, the RTT UPIUs generated by the CPU 8 are successively stored to the RTT transmission FIFO 15.

Figure 8:
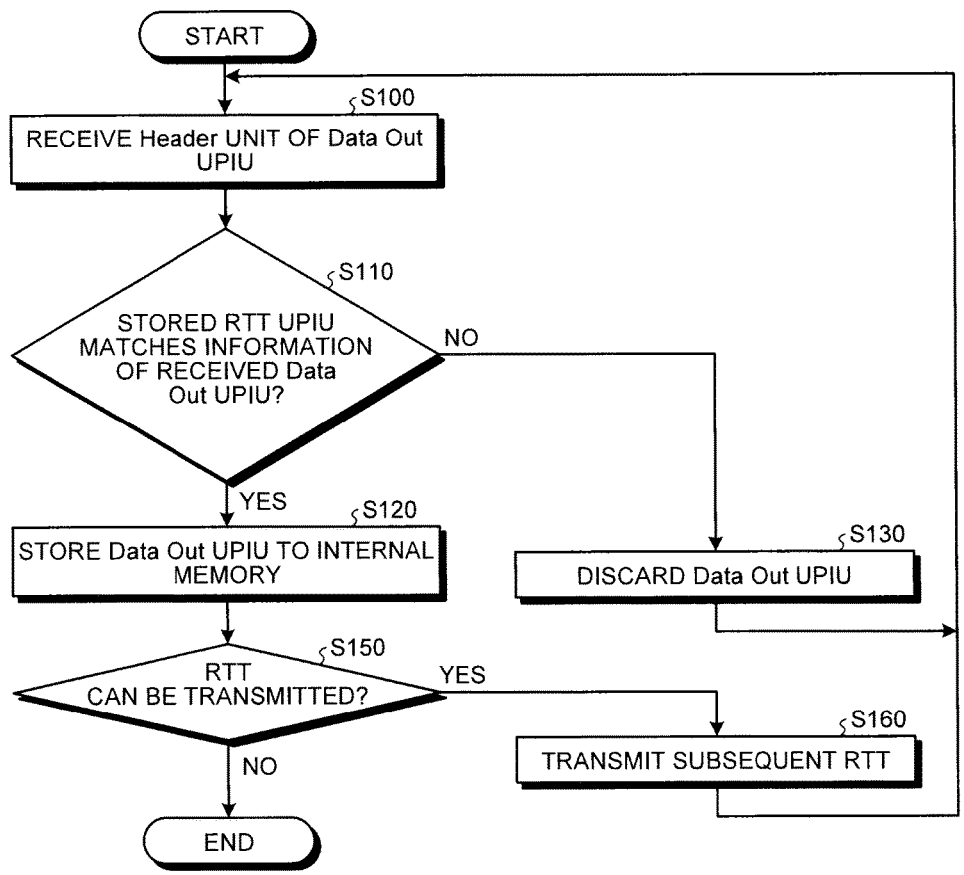
FIG. 8 is a flowchart illustrating reception processing of RTT UPIU according to the third embodiment.

FIG. 8 is a flowchart illustrating reception processing of RTT UPIU in the reception unit 10 according to the third embodiment. In FIG. 8, the processing contents in steps S100 to S130 are the same processing contents in steps S100 to S130 as illustrated in FIG. 4, and repeated explanation is omitted. When the comparison result matches in the RTT comparator 13, the reception unit 10 stores the payload of the received Data Out UPIU to the internal memory 6, and deletes the matching RTT UPIU from the RTT storing unit 12 (step S120). When the processing in step S120 is finished, the transmission unit 11 determines whether an RTT UPIU, which is to be subsequently transmitted, is stored in the RTT transmission FIFO 15 or not (step S150). When the determination result in step S150 is Yes, the transmission unit 11 transmits a subsequent RTT UPIU stored in the RTT transmission FIFO 15 to the initiator 2 (step S150). When the determination result in step S150 is Yes, the transmission unit 11 terminates the processing.

As described above, according to the third embodiment, when the normal Data Out UPIU is received, the target 1 transmits the subsequent RTT UPIU, and therefore, the RTT UPIU can be transmitted efficiently.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
a nonvolatile first memory;
a second memory; and
a controller circuit including a processor circuit and an interface circuit being different from the processor circuit, wherein
when receiving a first packet from an initiator, the interface circuit transmits a second packet to the initiator, the first packet being a write command, the second packet requesting data transfer to the memory device, the second packet specifying content of a third packet, the third packet including a header and data,
the interface circuit is configured to receive the header of the third packet from the initiator and compare a header of the second packet transmitted to the initiator with the received header of the third packet, the controller circuit is configured to determine whether to store at least the data of the third packet to the second memory based on the comparison result of the interface circuit, in a case where the comparison result of the interface circuit shows that the header of the third packet matches the header of the second packet, the interface circuit receives the data of the third packet and the processor circuit temporarily stores at least the received data of the third packet to the second memory, and the processor circuit writes the temporarily stored data of the third packet to the first memory, and in a case where the comparison result of the interface circuit shows that the header of the third packet does not match the header of the second packet, the interface circuit notifies an interruption to the processor circuit and the processor circuit discards the data of the third packet without storing the data of the third packet in the second memory.

2. The memory device according to claim 1, wherein
the interface circuit includes a packet storing unit that temporarily stores the second packet transmitted to the initiator, and
the interface circuit is configured to compare the header of the third packet received from the initiator with the header of the second packet stored in the packet storing unit.

3. The memory device according to claim 2, wherein the interface circuit is configured to delete the second packet from the packet storing unit in the case where the header of the third packet matches the header of the second packet.

4. The memory device according to claim 3, wherein in a case that a plurality of second packets are permitted to be transmitted continuously, the interface circuit compares the header of the third packet received from the initiator with one second packet stored earliest in the packet storing unit.

5. The memory device according to claim 3, wherein in a case that a plurality of second packets are permitted to be transmitted continuously, the interface circuit compares the header of the third packet received from the initiator with any one of the plurality of second packets stored in the packet storing unit.

6. The memory device according to claim 2, wherein the interface circuit is configured to delete the second packet stored in the packet storing unit when receiving an abort request from the initiator.

7. The memory device according to claim 1, wherein in response to the notification of the interruption, the processor circuit is configured to control the interface circuit to notify error information to the initiator.

8. The memory device according to claim 1, wherein when the header of the third packet received from the initiator matches the header of the second packet transmitted to the initiator, the interface circuit is configured to transmit a subsequent second packet to the initiator.

9. The memory device according to claim 1, wherein the first packet is a write command in a format of Command UPIU, and the second packet is Ready To Transfer UPIU, and the third packet is Data Out UPIU.

10. A memory controller for a memory device for controlling a nonvolatile first memory, the memory controller comprising:
a second memory; and
a controller circuit including a processor circuit and an interface circuit being different from the processor circuit; wherein when receiving a first packet from an initiator, the interface circuit transmits a second packet to the initiator, the first packet being a write command, the second packet requesting data transfer to the memory device, the second packet specifying content of a third packet, the third packet including a header and data, the interface circuit is configured to receive the header of the third packet from the initiator and compare a header of the second packet transmitted to the initiator with the received header of the third packet, the controller circuit is configured to determine whether to store at least the data of the third packet to the second memory based on the comparison result of the interface circuit, in a case where the comparison result of the interface circuit shows that the header of the third packet matches the header of the second packet, the interface circuit receives the data of the third packet and the processor circuit temporarily stores at least the received data of the third packet to the second memory, and the processor circuit writes the temporarily stored data of the third packet to the first memory, and in a case where the comparison result of the interface circuit shows that the header of the third packet does not match the header of the second packet, the interface circuit notifies an interruption to the processor circuit and the processor circuit discards the data of the third packet without storing the data of the third packet in the second memory.

11. The memory controller according to claim 10, wherein the interface circuit unit includes a packet storing unit that temporarily stores the second packet transmitted to the initiator, and the interface circuit unit is configured to compare the header of the third packet received from the initiator with the header of the second packet stored in the packet storing unit.

12. The memory controller according to claim 11, wherein the interface circuit is configured to delete the second packet from the packet storing unit in the case where the header of the third packet matches the header of the second packet.

13. The memory controller according to claim 12, wherein in a case that a plurality of second packets are permitted to be transmitted continuously, the interface circuit compares the header of the third packet received from the initiator with one second packet stored earliest in the packet storing unit.

14. The memory controller according to claim 12, wherein in a case that a plurality of second packets are permitted to be transmitted continuously, the interface circuit compares the header of the third packet received from the initiator with any one of the plurality of second packets stored in the packet storing unit.

15. The memory controller according to claim 11, wherein the interface circuit is configured to delete the second packet stored in the packet storing unit when receiving an abort request from the initiator.

16. The memory controller according to claim 10, wherein in response to the notification of the interruption, the processor circuit is configured to control the interface circuit to notify error information to the initiator.

17. The memory controller according to claim 10, wherein when the header of the third packet received from the initiator matches the header of the second packet transmitted to the initiator, the interface circuit is configured to transmit a subsequent second packet to the initiator.

18. The memory controller according to claim 10, wherein the first packet is a write command in a format of Command UPIU, and the second packet is Ready To Transfer UPIU, and the third packet is Data Out UPIU.

* * * * *